June 3, 1958   R. A. AYERS   2,837,081
HEATING VESSEL
Filed June 10, 1954

INVENTOR
Richard A. Ayers
BY
ATTORNEY

United States Patent Office 2,837,081
Patented June 3, 1958

2,837,081

HEATING VESSEL

Richard A. Ayers, Kensington, Md.

Application June 10, 1954, Serial No. 435,854

3 Claims. (Cl. 126—261)

The present invention relates to an improved heating vessel and more particularly to a novel heating cup for warming pre-filled baby bottles.

Normally, pre-filled baby bottles are kept under refrigeration until needed, when they are placed in a heating vessel of some type. One method utilizes a pan of water heated over a heating unit. Other devices on the market are electrical unit bottle containers constructed to receive a baby bottle resting just above electrodes within the container. When using an ordinary pan or the special self contained units, the heat source is at the bottom of the container and a certain time lapse is experienced prior to the container, water and bottle reaching proper temperature. Furthermore, the special unit containers are costly in relation to ordinary pots and pans.

This invention contemplates the use of a cup shaped container having a sleeve spaced therearound to confine and direct heated gases, surrounding and passing away from a heating unit, to the sides of the cup shaped container to evenly and rapidly apply heat to all portions of the container. The heating vessel can be manufactured of inexpensive non-critical materials such as tin plated sheet iron, aluminum or any suitable sheet metal and can be assembled for a reasonably low cost.

A vessel of this type may be used for heating items other than baby bottles, although the latter is the preferred embodiment. Many users of baby bottle warming devices, particularly fathers, will welcome a device that will warm a bottle in a shorter time.

Through tests, it has been ascertained that a cup utilizing the sleeve of this invention, surrounding and spaced from the sides of the cup, will bring liquid within the cup to a boil somewhere between 10 to 25 percent faster than will a cup without a sleeve, all variables being the same in both cases. Using this heating unit to warm bottles of baby formula, it has been noted that the time period necessary to bring water to a boil, over gas heat, enables sufficient units of heat energy to transfer to the bottle and after mild agitation by shaking, the temperature of the formula in the bottle will be proper for feeding to the baby. When the test was made over electric units, the time for bringing the water to a boil increased but percentages of time saved over that needed with a pan or cup without a sleeve remained substantially the same as for a gas unit. Over an electric heating unit, the water need not come to a boil to heat a bottle of formula to proper temperature, inasmuch as heat is being transferred evenly around the sides of the cup during the entire period.

Accordingly a primary object of this invention resides in the provision of a simple inexpensive heating vessel that will conserve heat energy and minimize time required to bring the vessel and contents to a desired temperature.

A further object resides in a novel heating vessel with provisions for maintaining even temperatures throughout the side walls of a container.

A still further object resides in a novel heating vessel which when utilized with an inner food container will rapidly bring the inner container to a desired temperature.

The above and further objects and advantages will become apparent when taken in conjunction with the appended claims and following description of the preferred embodiment illustrated in the drawing, wherein:

Figure 1:
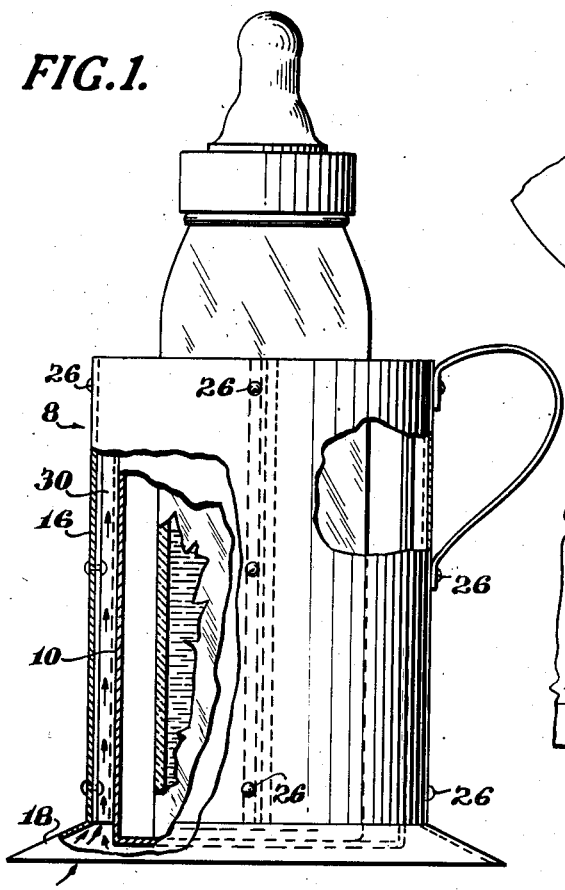
Figure 1 is a fragmentary side elevation of the heating vessel.

Referring to the drawings in more detail, the heating vessel 8 comprises a cup-shaped receptacle 10 made of suitable material such as copper, aluminum or tinplated sheet iron; and is spun, pressed or otherwise formed to the proper shape. When manufactured for use as a baby bottle warmer, the inside diameter of the container 10 should be ½ to ¾ of an inch larger than the diameter of average conventional baby bottles to enable a relatively thin layer of water to surround the bottles when placed in the cup.

Figure 3:
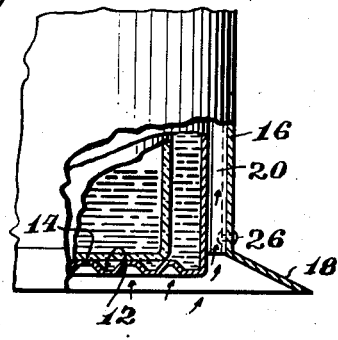
Figure 3 is a fragmentary partial elevation view similar to Figure 1 showing a modified bottom wall of the cup.

The cup bottom 12 is preferably flat as disclosed in Figure 1 and takes advantage of the indentation normally formed on the bottom of baby bottles. The indentation traps a small quantity of water that will rapidly boil and escape as steam from under the bottom of the bottle edges. The escape of steam will agitate the bottle slightly and circulate the formula within it. Since this warmer unit applies more heat to the sides of inner containers than bottom heating units, a slight agitation of the inner food container or baby bottle is desirable. If desired, indentations, such as those shown at 14 in Figure 3, may be utilized to maintain a space between the bottle or inner food container and the bottom cup wall 12.

Surrounding and spaced from the container 10 is a sleeve member 16 having a flared bottom 18 that provides a support to enable the vessel 8 to rest on a heating unit and also directs a major portion of the heated gases to the interior of sleeve 16. In the drawings, container 10 and sleeve 16 are shown as being circular in cross-section, however the cross sectional configuration may be any shape consistent with manufacturing ability and procedure.

Figure 2:
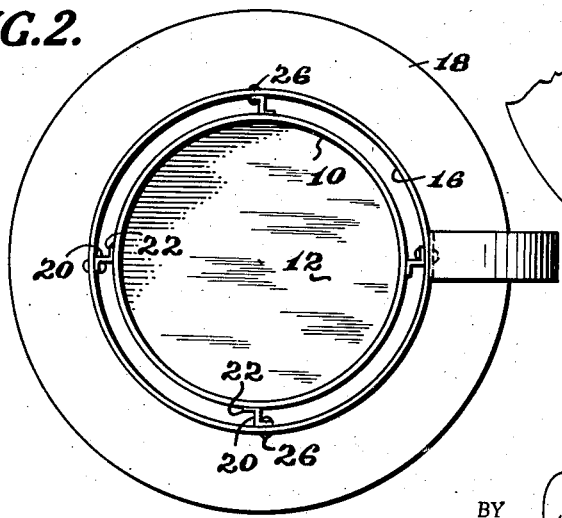
Figure 2 is a top plan view of the vessel of Figure 1.

The sleeve 16 is spaced and fastened to container 10 by a plurality of brackets such as the Z-shaped brackets 20 shown in Figure 2, having their inner elements 22 fastened to the container 10 as by spot welding prior to assembly within sleeve 16. Outer bracket elements 24 may be fastened to the sleeve by spot welding, metal screws, or riveting 26 as shown.

Figure 4:
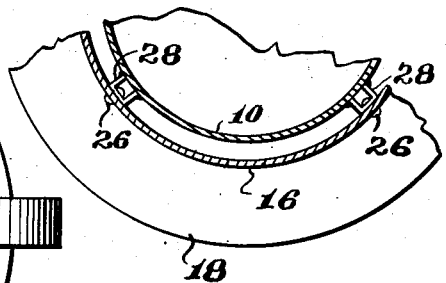

As disclosed in Figure 4, the brackets may alternatively be U-shaped as at 28 with the legs welded to container 10 and the bight riveted or otherwise secured to sleeve 16 as at 26.

Figure 5:
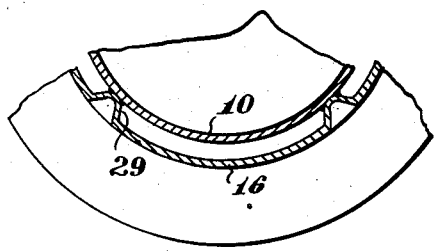
Figures 4 and 5 are partial top plan views similar to Figure 2 showing modified connecting means between the container and sleeve.

The sleeve may alternatively be connected to the inner container as shown in Figure 5, wherein indentations 29 are formed in the outer shell to pilot and space the shell from the inner container 10. The inner extremities of the indentations are spot welded to the inner container.

When assembled, the sleeve and container provide a straight through annular passage 30, open at both ends, for hot gases entering at the bottom opening. This feature assures a constant flow of heated gases, flowing upward from a heating unit, gas, electric or otherwise, in confined relation against the side wall of the cup-shaped container 10.

When the vessel is used as a baby bottle warmer, the inside diameter of container 10 is approximately 2 and ¾ inches and the annular spacing between the container and the sleeve 16 is approximately ¼ inch.

It will be understood from the foregoing description that this invention provides an efficient economical solution to the long-standing need of a rapid heating vessel, particularly where warming a baby formula is involved. It is thus apparent that higher speed, over methods formerly used, in heating any form of food will result with this invention. This will also affect savings in heating costs.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A cooking utensil adapted to rest over a source of heat, comprising: an inner member of cup-shaped configuration consisting solely of imperforate side and bottom portions with said side portion being substantially normal to said bottom portion; a sleeve encompassing, substantially parallel to, and spaced from said side portion; means on said sleeve, disposed between the ends of said sleeve, projecting inwardly and rigidly secured to said inner member side portion to maintain said sleeve in spaced arrangement around said inner member side portion and providing a continuous opening at the utensil base between said inner member and said sleeve, a substantially vertical through passage from bottom to the top of the utensil substantially surrounding said inner member and a continuous opening at the utensil top between said inner member and said sleeve, said means including elongate thin plate portions extending from closely adjacent the top of said sleeve to closely adjacent the bottom of said sleeve, essentially the entire extent of said thin plate portions being parallel to a vertical axis through the center of the cup-shaped member.

2. A cooking utensil as defined in claim 1, wherein said elongate thin plate portions on said sleeve comprise vertically disposed elongate channel members fastened on said sleeve and on said cup-shaped member.

3. A cooking utensil as defined in claim 1, wherein said elongate thin plate portions on said sleeve comprise radially inwardly projecting elongate indentations in said sleeve engaging said cup-shaped member and rigidly secured thereto.

References Cited in the file of this patent

UNITED STATES PATENTS

| | | |
|---|---|---|
| 820,029 | Waugh | May 8, 1906 |
| 1,250,260 | Wilcox | Dec. 18, 1917 |
| 1,785,438 | Edlin | Dec. 16, 1930 |
| 2,010,316 | Gorman | Aug. 6, 1935 |
| 2,419,416 | Mustain | Apr. 22, 1947 |

FOREIGN PATENTS

| | | |
|---|---|---|
| 13,370 | Australia | Dec. 29, 1908 |
| 378,235 | Germany | Jan. 21, 1921 |
| 174,476 | Great Britain | Feb. 2, 1922 |
| 589,530 | Great Britain | June 23, 1947 |
| 338,084 | Italy | Mar. 28, 1936 |